(12) United States Patent
Xu et al.

(10) Patent No.: US 10,084,387 B2
(45) Date of Patent: Sep. 25, 2018

(54) LCC AND MMC SERIES-CONNECTED HVDC SYSTEM WITH DC FAULT RIDE-THROUGH CAPABILITY

(71) Applicant: ZHEJIANG UNIVERSITY, Hangzhou, Zhejiang Province (CN)

(72) Inventors: Zheng Xu, Hangzhou (CN); Shijia Wang, Hangzhou (CN); Huangqing Xiao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 15/522,954

(22) PCT Filed: Apr. 11, 2016

(86) PCT No.: PCT/CN2016/078928
§ 371 (c)(1),
(2) Date: Apr. 28, 2017

(87) PCT Pub. No.: WO2017/031991
PCT Pub. Date: Mar. 2, 2017

(65) Prior Publication Data
US 2017/0331390 A1    Nov. 16, 2017

(30) Foreign Application Priority Data
Aug. 26, 2015  (CN) .......................... 2015 1 0530173

(51) Int. Cl.
*H02J 3/36*     (2006.01)
*H02M 5/458*    (2006.01)

(52) U.S. Cl.
CPC ................ *H02M 5/4585* (2013.01)

(58) Field of Classification Search
CPC ............... H02J 3/36; H02J 2003/365
(Continued)

(56) References Cited

U.S. PATENT DOCUMENTS

2014/0146582 A1*  5/2014  Gupta ................. H02M 7/7575
                                                       363/35
2014/0247629 A1*  9/2014  Crane ...................... H02J 3/36
                                                       363/35
(Continued)

FOREIGN PATENT DOCUMENTS

CN     103311947 A    9/2013
CN     103997033 A    8/2014

Primary Examiner — Alex Torres-Rivera
(74) Attorney, Agent, or Firm — Jiwen Chen

(57) ABSTRACT

The present invention discloses an LCC and MMC series-connected HVDC system with DC fault ride-through capacity, comprising rectifier and inverter linked by DC transmission line; Both the positive pole and the negative pole of the rectifier and the inverter consist of line-commutated converter and modular converter in series-connection; the modular converter adopts one MMC or several parallel-connected MMCs. The present invention has the advantage of low cost, low power loss and high reliability of the LCC, as well as flexible control, low harmonics and AC voltage support of the MMC. Further, the present invention is able to deal with DC fault by itself, hence additional DC fault clearing equipment is not needed. As a result, the present invention is suitable for the field of long-distance large-capacity power transmission and has broad development potential.

9 Claims, 9 Drawing Sheets

(58) Field of Classification Search
USPC .................................................... 363/35, 37
See application file for complete search history.

(56) References Cited

U.S. PATENT DOCUMENTS

2014/0268926 A1* 9/2014 Gupta .................... H02M 5/44
363/35
2015/0145252 A1* 5/2015 Lin ....................... H02M 7/145
290/44

\* cited by examiner

LCC AND MMC SERIES-CONNECTED HVDC SYSTEM WITH DC FAULT RIDE-THROUGH CAPABILITY

This is a U.S. national stage application of PCT Application No. PCT/CN2016/078928 under 35 U.S.C. 371, filed Apr. 11, 2016 in Chinese, claiming priority of Chinese Application No. 201510530173.9, filed Aug. 26, 2015, all of which are hereby incorporated by reference.

FIELD OF INVENTION

The present invention is related to power transmission technology field, in particular to an LCC (line-commutated converter) and MMC (modular multilevel converter) series-connected HVDC (high voltage direct current) system with DC fault ride-through capacity.

BACKGROUND ART

With the development of power system technologies, the cost of line-commutated converter based high voltage direct current transmission system (LCC-HVDC) decreases gradually, while the reliability improves and the power loss reduces continually. Currently, line-commutated converter based high voltage direct current transmission system has been widely used in large capacity long distance power transmission, island transmission and asynchronous network back-to-back interconnection. However, the LCC-HVDC has the following three shortcomings:

(1) Commutation failure occurs easily at the inverter. The main device of LCC-HVDC is the half-controlled thyristor, and its commutation depends on AC systems, hence fault or voltage distortion of AC system may lead to commutation failure. This will cause huge impact on the AC system and severely affects system's safe and smooth operation.

(2) Strong dependency on AC system. The LCC-HVDC cannot supply power to weak AC system or passive system.

(3) Large area occupied by converter station. The set point of LCC-HVDC is hard to choose and has big problems.

In summary, the above-mentioned shortcomings have restricted the application of LCC-HVDC.

The modular multilevel converter based high voltage direct current transmission system (MMC-HVDC) is a new type of flexible transmission system, and its basic device is the half-bridge submodule. Compared to the LCC-HVDC, the MMC-HVDC has many advantages, such as being able to control active power and reactive power independently, low switch frequency, low power loss, low distortion of output voltage, low cost of filters, low occupied area and, most importantly, inexistence of commutation failure. As a result, the MMC-HVDC has strong competitiveness in renewable energy integration, large-capacity power transmission and distribution for cities as well as supplying power to passive AC system.

However, the MMC-HVDC has the following shortcomings:

1) The MMC-HVDC cannot effectively deal with DC fault; hence the reliability is comparatively weak. When DC fault occurs, the freewheel diode, which is antiparallel to the full-controlled power electronic device, becomes the path between the energy feed point and the fault point; this will lead to transient overcurrent and must be cut off by tripping the AC mechanical switch. But 2-3 cycles time is the best for the AC mechanical switch to cut off the transient overcurrent; and during this period the current increases greatly, which requires larger rated parameters of equipment and means more construction cost. For this reason, the MMC-HVDC usually abandons overhead line and adopts cable as the transmission path, which is of lower fault rate but larger cost.

2) The design and installation of grounding branch is difficult. There are two grounding modes usually used, namely the reactor mode and the resistor mode. The former adopts star-connected reactors at the AC side, but the value of the reactor is hard to choose and the reactor will influence the operation range of converter reactive power. The latter adopts clamp resistor at the DC side; however, small-resistance will lead to great power loss, while large-resistance will result in poor grounding effect.

3) Compared to LCC-HVDC, the unit investment cost of MMC-HVDC is significantly higher; hence MMC-HVDC is less economical when applied to long-distance large-capacity power transmission.

The above-mentioned shortcomings have restricted the application of MMC-HVDC in engineering practice.

SUMMARY OF INVENTION

The present invention proposes an LCC and MMC series-connected HVDC system with DC fault ride-through capacity, which combines the advantages of LCC-HVDC and MMC-HVDC together. Compared to LCC-HVDC, the present invention has high-quality output voltage, is able to control active power and reactive power independently, as well as offer voltage support to AC system. Compared to MMC-HVDC, the present invention is able to deal with DC fault by itself and has better economical efficiency.

An LCC and MMC series-connected HVDC system with DC fault ride-through capacity, comprising rectifier and inverter linked by DC transmission line.

Wherein, the rectifier is used to transform there-phase AC current from sending system to DC current and further transmits it to the inverter by DC transmission line; the inverter is used to transform the DC current to three-phase AC current and further transmits it to receiving system.

Both the rectifier and the inverter adopt commutation unit of bipolar structure, namely the positive commutation unit and the negative commutation unit are series-connected and the connecting point is grounded. The commutation unit consists of line-commutated converter (LCC) and modular converter; wherein, one end of the LCC is connected to the DC transmission line, the other end of the LCC is connected to one end of the modular converter; the other end of the modular converter is connected to the ground.

Further, the rated DC voltage ratio of the LCC to the modular converter is not less than 0.8, so as to guarantee the reliable clearance of DC fault of the system.

Further, the modular converter adopts one MMC or several parallel-connected MMCs. If several parallel-connected MMCs are adopted, the modular converter equips current balance control.

Further, a passive filter is linked to the three-phase AC bus of the sending system and the receiving system; the passive filter is used to filter the AC current distortion caused by the LCC, and to compensate the reactive power consumption of the LCC.

Further, the positive and negative pole of the rectifier and the inverter connect the DC transmission line through smoothing reactor. The smoothing reactor is able to suppress the ripple wave of DC current; prevent the converter devices from being damaged by the overvoltage, which is caused by the shock wave of DC transmission line that enters into the converter station; avoid DC current cut-off and restrict the rising rate of DC current during fault period.

Further, DC filter is in parallel connection with the LCC, in order to filter and reduce the DC voltage distortion.

Further, the LCC adopts twelve-pulse bridge converter; each bridge arm comprises several series-connected thyristor valves. The twelve-pulse bridge is able to reduce harmonic current injected into the AC system.

Further, the LCC is connected to the AC system through one three-winding transformer of $Y_0/Y/\Delta$ connection, or two two-winding transformers of $Y_0/\Delta$ and $Y_0/Y$ connection, respectively. The above-mentioned transformer type offers the ability of AC voltage transformation, isolating the zero-sequence AC voltage between the converter and the AC system as well as providing two types of AC voltage with 30° phase deviation for the two series-connected six-pulse bridge converters.

Further, the MMC is connected to AC system through a two-winding transformer of $\Delta/Y_0$ connection or $Y/Y_0$ connection. The MMC adopts the three-phase six-arm structure. An arm consists of several series-connected commutation modules. The total harmonic distortion of the output AC voltage of MMC is quite small; hence AC filter is hardly needed. Besides, the power loss of MMC is decreased, due to the reduction of switch frequency.

Further, the commutation module adopts half-bridge submodule (HBSM). The HBSM needs the smallest number of power electronics devices and hence has the lowest operation loss.

The HBSM consists of two switch tubes (T1 and T2) and one capacitor. Wherein, one end of T1 and one end of T2 are connected and form the positive pole of HBSM; the other end of T1 connects one end of the capacitor; the other end of T2 and the other end of the capacitor are connected and form the negative pole of HBSM. Both control ends of T1 and T2 receive external switch signals.

Each switch tube adopts one insulated gate bipolar translator (IGBT) and one diode in antiparallel connection.

The LCC and MMC series-connected HVDC system has three operation modes, namely bipolar current balance mode, monopolar mode with ground return path and monopolar mode with metallic return path.

The LCC and MMC series-connected HVDC system is able to deal with DC fault by the force retard of LCC at the rectifier side, the unidirectional continuity of LCC at the inverter side and the blocking of MMCs at both sides. For the force retard of LCC at the rectifier side, the firing angle is about 135°~145°. At the same time, applying a latching control to the modular converter in the rectifier station fault pole commutation unit so that the series hybrid bipolar DC transmission system outputs a negative voltage on the rectifier station fault pole commutation unit, thereby eliminating the risk pole converter unit provides fault current; and inverter station fault pole commutation unit due to the one-way conduction of the thyristor converter, the fault current will be naturally cleared.

In normal operation conditions, the modular converters of bipole at both rectifier and inverter control the DC voltage of themselves; the LCCs of bipole at rectifier control DC current, the order of DC current is derived from the order of active power; the LCCs of bipole at inverter also control DC voltage of themselves. Besides, the modular converters at both rectifier and inverter can further control reactive power.

When monopolar DC fault occurs, the modular converters of the fault pole are blocked; the rectifier LCC of the fault pole is forcedly retarded by increasing its firing angle to output negative DC voltage, hence making the total DC voltage of rectifier below zero and the DC fault current from rectifier damped. Due to the unidirectional continuity of LCC, the energy path from the inverter AC system to the fault point is blocked; hence the inverter AC system will not contribute to the fault current. The monopolar DC fault is cleared if the DC fault current drops to zero; after that the fault pole stands by for recovering while the healthy pole keeps operating.

When bipolar DC fault occurs, the modular converters of bipole are blocked; the rectifier LCCs of bipole are forcedly retarded by increasing their firing angle to output negative DC voltage, hence making the total DC voltage of rectifier below zero and the DC fault current from rectifier damped. Due to the unidirectional continuity of LCC, the energy path from the inverter AC system to the fault point is blocked; hence the inverter AC system will not contributes to the fault current. The bipolar DC fault is cleared if the DC fault current drops to zero; after that the system stands by for recovering. At this point the DC transmission system connected to the two ends of the AC system no longer have energy exchange, DC system turn into the restart wait mode.

The present invention combines the advantages of LCC-HVDC and MMC-HVDC. Compared to the LCC-HVDC, the present invention has high-quality output voltage, occupies less area, controls active power and reactive power independently, and offers voltage support to AC system. Further compared to the MMC-HVDC, the present invention can rely on the converter's own action to clear the DC fault, no need to configure the DC circuit breaker, and greatly reduce the cost of the total number of devices, saving the cost and reduce the loss. In summary, the series hybrid bipolar DC transmission system can be applied to the field of long-distance and high-capacity DC transmission, and it is worth popularizing.

PREFERRED EMBODIMENTS OF THE INVENTION

In order to more specifically describe the present invention, the technical solutions of the present invention and the related principles thereof will be described in detail with reference to the accompanying drawings and specific embodiments.

Figure 1:
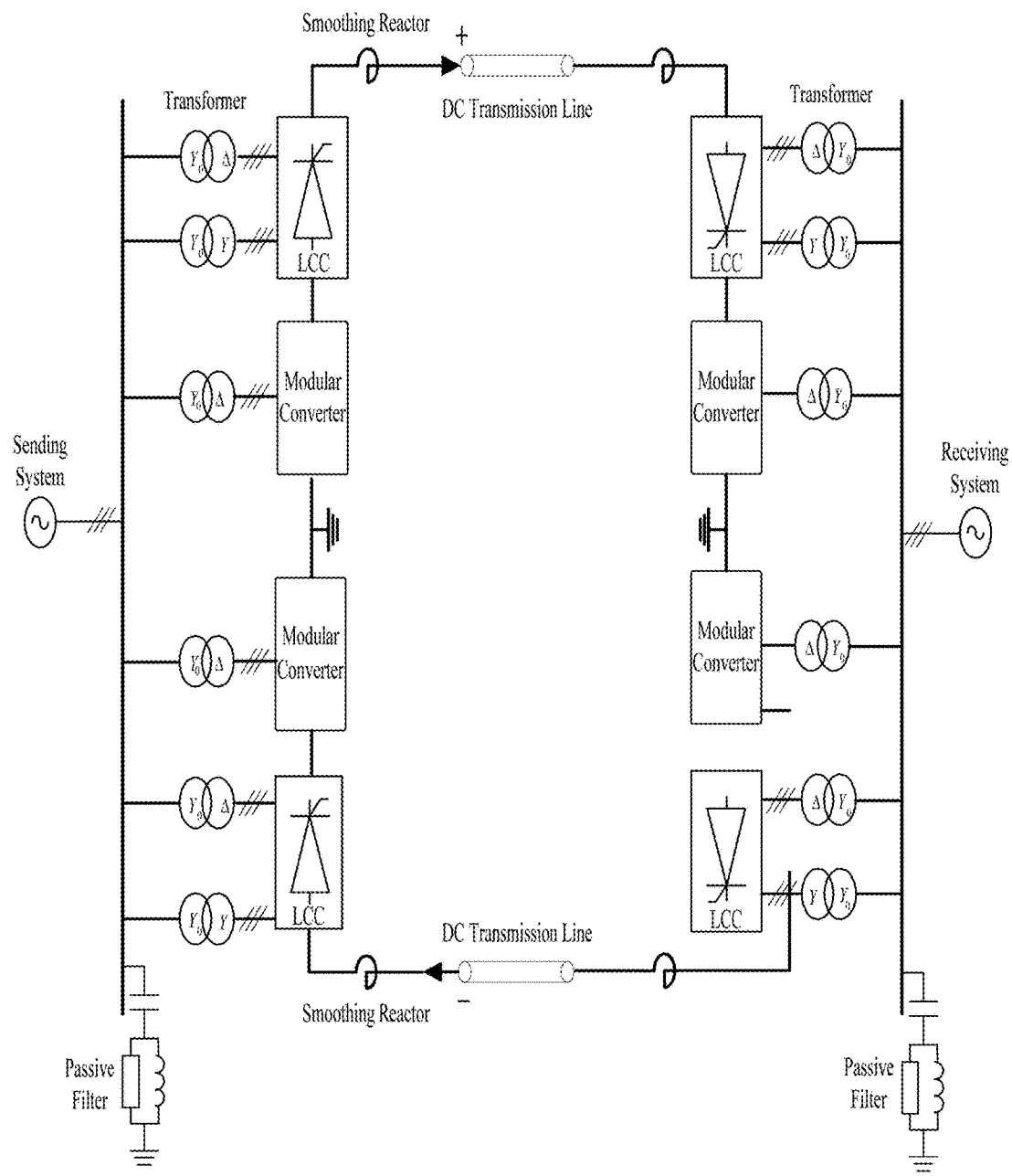
FIG. 1 is a structure diagram of the present invention.

FIG. 1 is a structure diagram of the LCC and MMC series-connected HVDC system, which comprises rectifier and inverter linked by DC transmission line.

Wherein, the bipole of the rectifier and inverter consist of LCC and modular converter in series connection, the modular converter adopts one MMC or several parallel-connected MMCs.

The three-phase AC buses of both sending and receiving system connect passive filters; the type, capacity, number of banks and tuning point of the AC filters depend on engineering condition. Generally, double-tuned filter and shunt capacitor can be applied to filter out the characteristic harmonics; C type filter can also be applied to filter out the low-order harmonics if needed.

Figure 2:
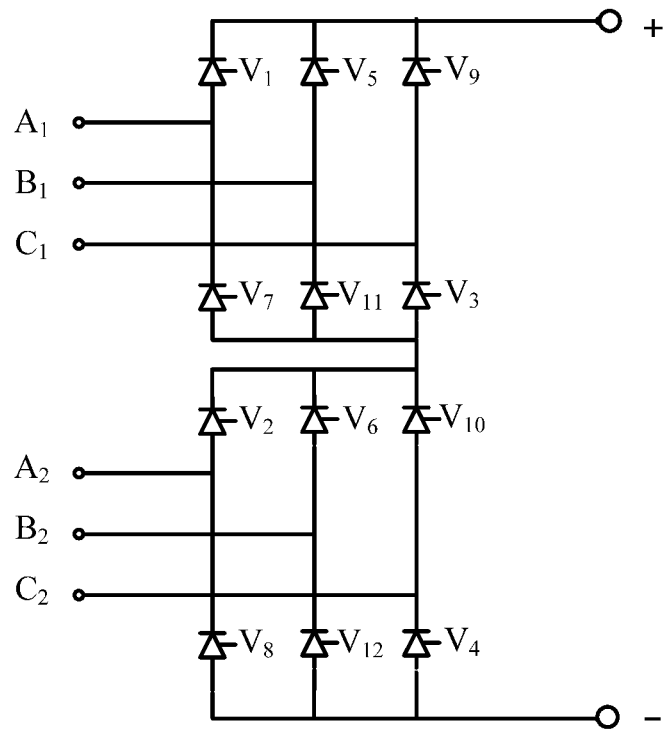
FIG. 2 is a structure diagram of the twelve-pulse bridge converter.

As shown in FIG. 2, the LCC adopts twelve-pulse bridge converter; wherein, each bridge consists of several series-connected thyristors; the LCC at rectifier is configured in rectification mode and is in control of constant DC current; the LCC at inverter is configured in inversion mode and is in control of constant DC voltage.

Each LCC is connected to the AC system through two two-winding transformers of $Y_0/\Delta$ and $Y_0/Y$ connection, respectively. The transformers offer AC voltage transformation to match the rated DC voltage. The difference of the connection modes of the transformers offers two types of AC voltage with 30° phase deviation for the two series-connected six-pulse bridge converters in one twelve-pulse bridge converter.

Figure 3:
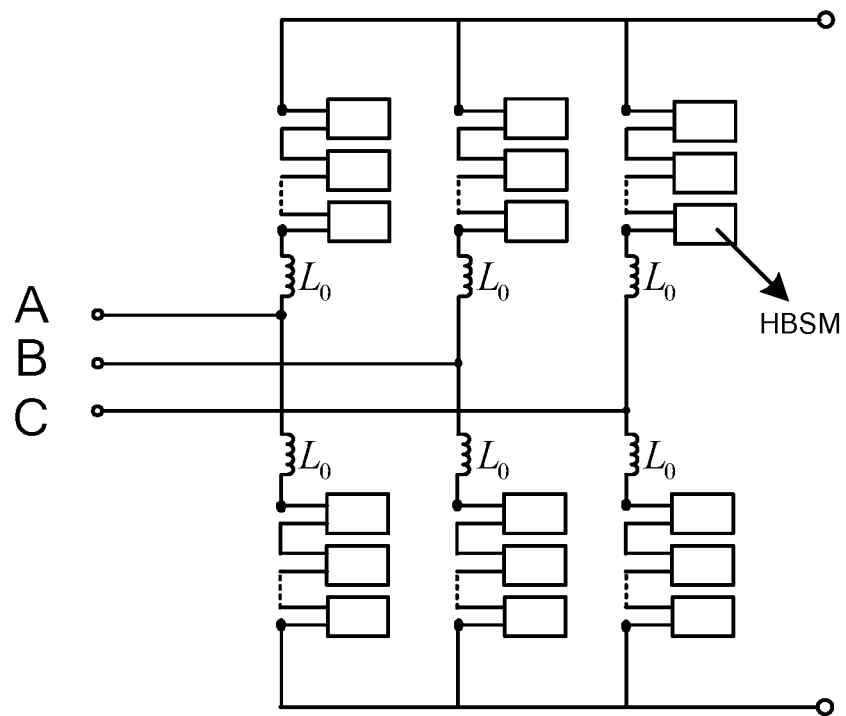
FIG. 3 is a structure diagram of the MMC.

As shown in FIG. 3, the MMC adopts three-phase six-arm structure; wherein, each arm consists of several series-connected commutation modules. The MMC is in control of constant DC voltage and constant reactive power. The MMC is connected to the AC system through a two-winding transformer of $\Delta/Y_0$ connection.

Figure 4:
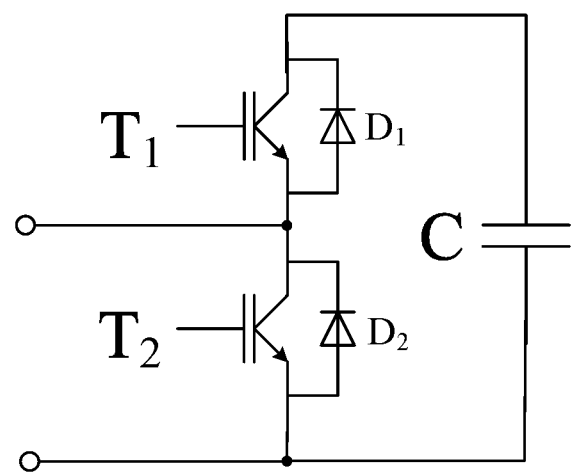
FIG. 4 is a structure diagram of the HBSM.

The commutation module adopts half-bridge submodule (HBSM), and the structure of HBSM is shown in FIG. 4. A HBSM consists of two switch tubes (T1 and T2) and one capacitor; a switch tube adopts insulated gate bipolar translator (IGBT) and diode in antiparallel connection. The emitter of IGBT in T1 connects the collector of IGBT in T2 and forms the positive pole of HBSM; the collector of IGBT in T1 connects one end of the capacitor; the emitter of IGBT in T2 connects the other end of the capacitor and forms the negative pole of HBSM. The gates of IGBT in T1 and T2 receive external switch signals.

The switching strategy of HBSM is based on the nearest level modulation and the voltage balance control of submodule capacitor.

Figure 5:
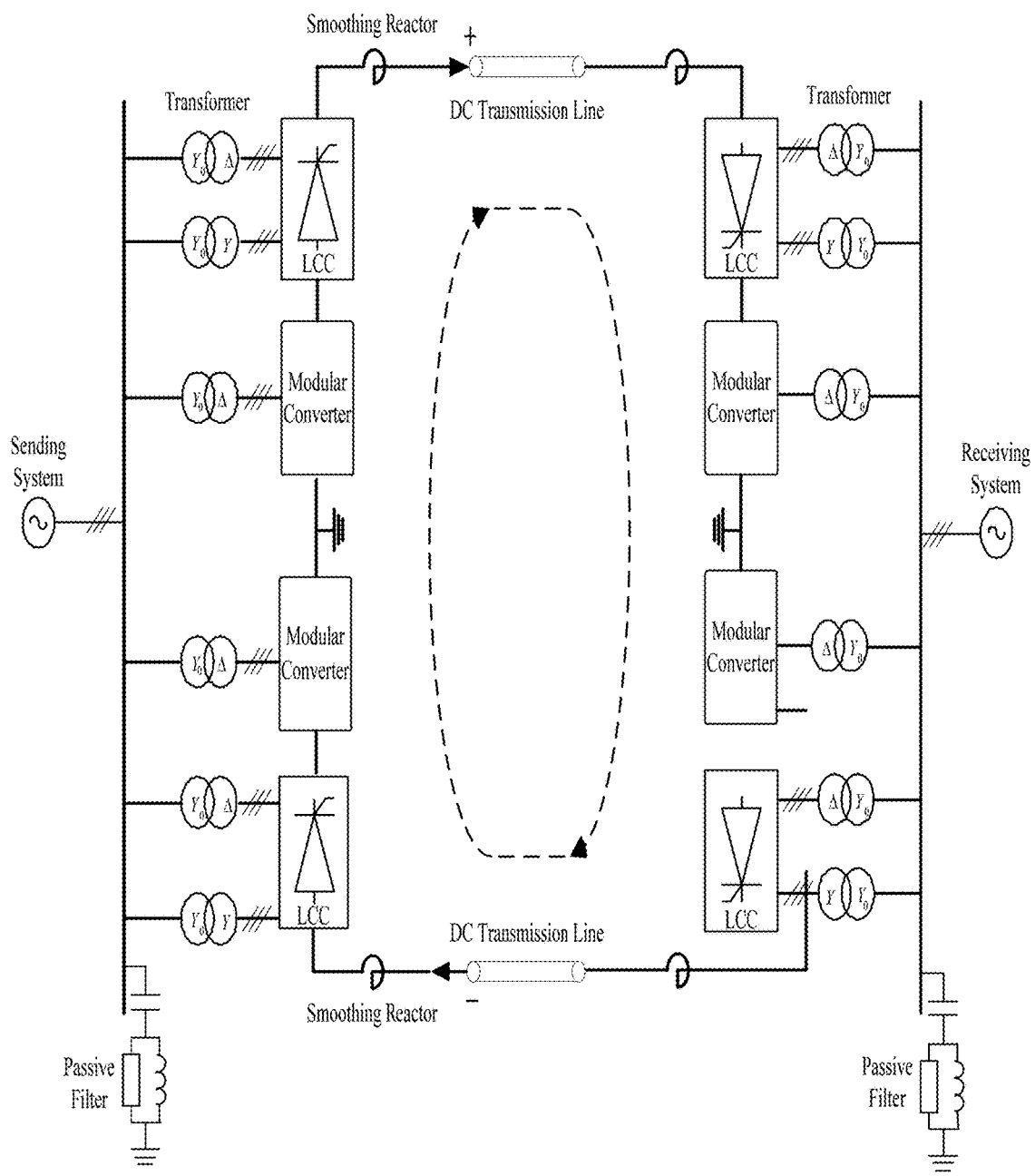
FIG. 5 is a schematic diagram of the present invention in bipolar current balance mode.

In this preferred embodiment, the system is in bipolar current balance mode under normal condition, as shown in FIG. 5. The LCCs in the rectifier of both the positive pole and negative pole control DC current with same current order; the LCCs in the inverter of positive pole and negative pole are in constant DC voltage control. All the MMCs are in constant DC voltage control and constant reactive power control. In this control mode, the DC voltages of the positive pole and the negative pole are the same if their active power orders are the same; the positive pole or the negative pole will has larger DC voltage if the active power order of it is larger. Generally, the active power orders of both poles are set as the same to maintain the current of grounding electrodes to be zero.

Figure 6A:
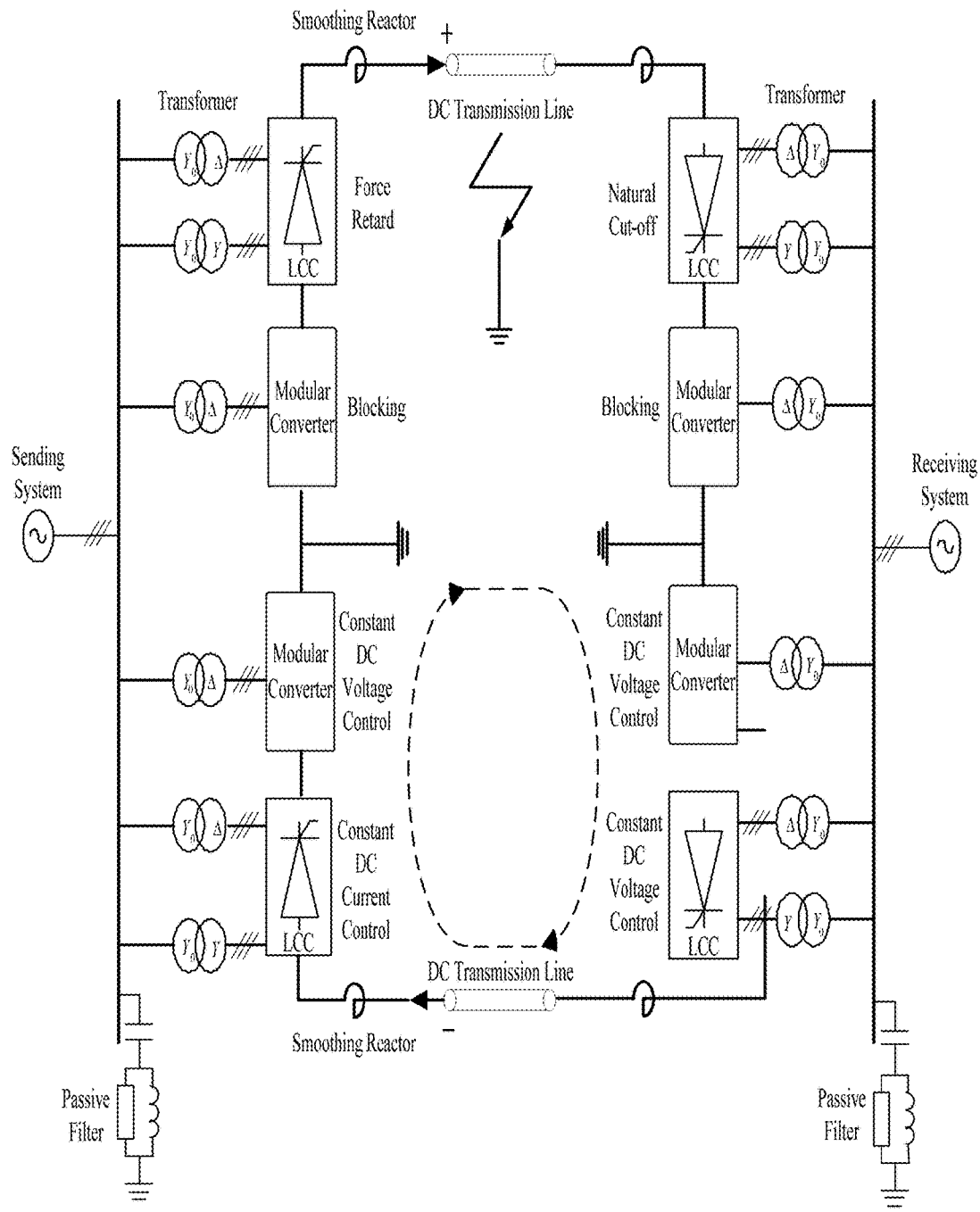
FIG. 6a is an operation diagram of the present invention when DC fault of positive pole occurs.
Figure 6B:
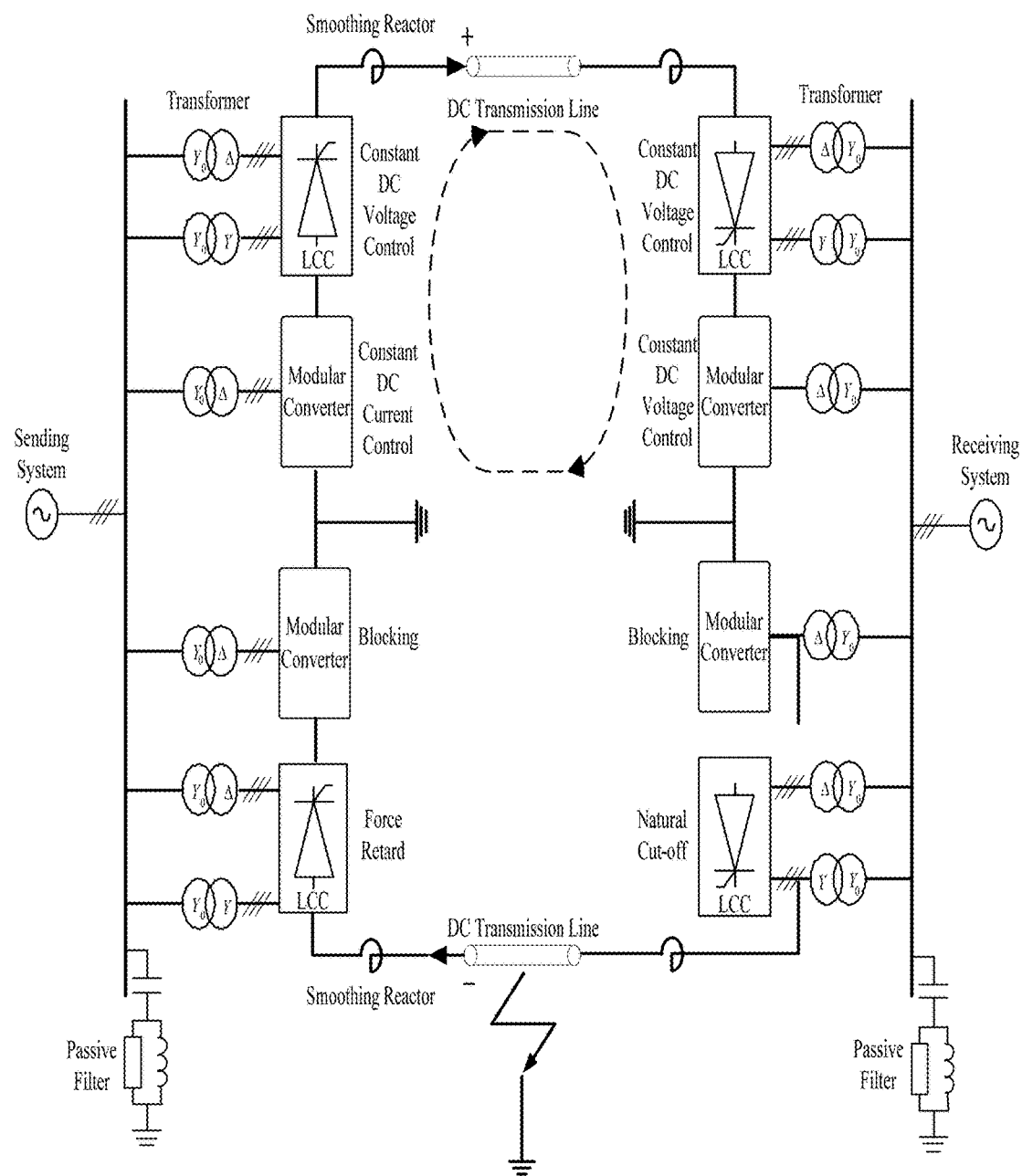
FIG. 6b is an operation diagram of the present invention when DC fault of negative pole occurs.

The mechanism of DC fault clearance in this preferred embodiment is as below. When monopolar DC fault occurs (as shown in FIG. 6(a) and FIG. 6(b), respectively), the MMCs of the fault pole are blocked; the rectifier LCC of the fault pole is forcedly retarded by increasing its firing angle to output negative DC voltage, hence making the total rectifier DC voltage of fault pole below zero and the DC fault current from rectifier damped. Due to the unidirectional continuity of LCC, the energy path from the inverter AC system to the fault point is blocked; hence the inverter AC system will not contributes to the fault current. The monopolar DC fault is cleared if the DC fault current drops to zero; after that the fault pole stands by for recovering while the other pole keeps operating.

Figure 6C:
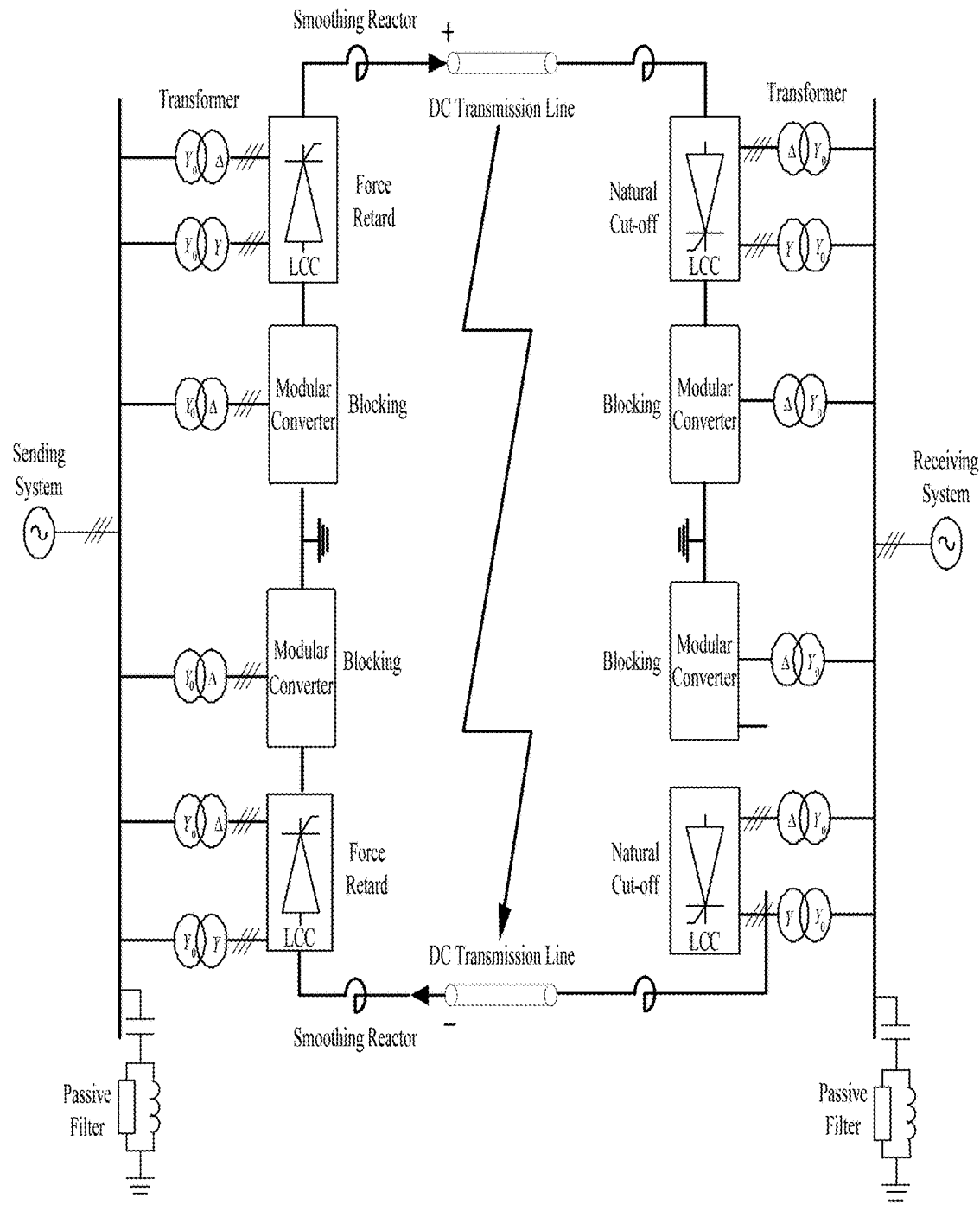
FIG. 6c is an operation diagram of the present invention when bipolar DC fault occurs.

When bipolar DC fault occurs, all the MMCs are blocked, as shown in FIG. 6(c), the rectifier LCCs of bipole are forcedly retarded by increasing their firing angle to output negative DC voltage, hence making the total DC voltage of rectifier below zero and the DC fault current from rectifier damped. Due to the unidirectional continuity of LCC, the energy path from the inverter AC system to the fault point is blocked; hence the inverter AC system will not contributes to the fault current. The bipolar DC fault is cleared if the DC fault current drops to zero; after that the system stands by for recovering.

In order to further demonstrate the effectiveness of the preferred embodiment, a time-domain simulation model is built up in power system transient simulation software PSCAD/EMTDC, the simulation parameters are listed in TABLE 1.

TABLE 1

| | | | |
|---|---|---|---|
| Rated DC voltage | | ±800 kV | |
| Rated DC current | | 4 kA | |
| Rated active power | | 6400 MVA | |
| Rated DC voltage of LCC at rectifier side | | 400 kV | |
| Rated DC voltage of MMC at rectifier side | | 400 kV | |
| Rated DC voltage of LCC at inverter side | | 380 kV | |
| Rated DC voltage of MMC at inverter side | | 380 kV | |
| AC RMS voltage at rectifier side | | 500 kV | |
| AC RMS voltage at inverter side | | 500 kV | |
| LCC commutation transformer at rectifier side | Group number | 1 | 2 |
| | Wiring mode | $Y_0/\Delta$ | $Y_0/Y$ |
| | Ratio of transformation | 500 kV:165 kV | 500 kV:165 kV |
| | Capacity | 1000 MVA | 1000 MVA |
| MMC commutation transformer at rectifier side | Wiring mode | $Y_0/\Delta$ | |
| | Ratio of transformation | 500 kV:200 kV | |
| | Capacity | 480 MVA | |

TABLE 1-continued

| LCC commutation transformer at inverter side | Group number | 1 | 2 |
|---|---|---|---|
| | Wiring mode | $Y_0/\Delta$ | $Y_0/Y$ |
| | Ratio of transformation | 500 kV:150 kV | 500 kV:150 kV |
| | Capacity | 1000 MVA | 1000 MVA |
| MMC commutation transformer at inverter side | Wiring mode | $Y_0/\Delta$ | |
| | Ratio of transformation | 500 kV:200 kV | |
| | Capacity | 480 MVA | |
| Smoothing reactor | | 0.3 H | |
| DC transmission line | | 1000 km | |
| Number of MMCs in parallel connection | | 4 | |
| Number of HBSMs in one arm | | 50 (300 in one MMC) | |
| Value of HBSM capacitor | | 1665 uF | |
| Value of arm reactor | | 0.055 H | |

Monopolar DC transmission line fault is the most likely to occur; in this preferred embodiment, the monopolar DC transmission line fault is applied at the middle point of the positive DC transmission line at 1.0 s with ground resistance 1.0Ω. The DC fault clearing method is as below. The DC fault is detected by the system if DC current is larger than 1.5 pu. After the fault is detected, the MMCs at both sides of the fault pole are blocked; $\alpha_R$ is set to 135°; $\alpha_I$ is set to 90° and kept until the system restarts. After the fault current cleared, the action of LCCs and MMCs is kept for another 0.2 s so that insulation of the fault point can be recovered. After deionisation, the MMCs at both sides are deblocked; for LCCs, $\alpha_R$ is set to 45° and then linearly decreased to 15°, $\alpha_I$ is set to 120° and then linearly increased to 140°; the restart process lasts 0.2 s. After these actions completed, the system is shifted to the normal operation mode.

The fault response is shown in FIG. 7. FIGS. 7a and 7b are the waveform of rectifier DC voltage and DC current, respectively. The two diagrams show that, after the positive DC fault occurs, the force retard of rectifier LCC makes the rectifier DC voltage negative and hence the rectifier DC current drops to zero; the rectifier DC voltage and DC current of negative pole return to normal after slight fluctuation.

Figure 7A:
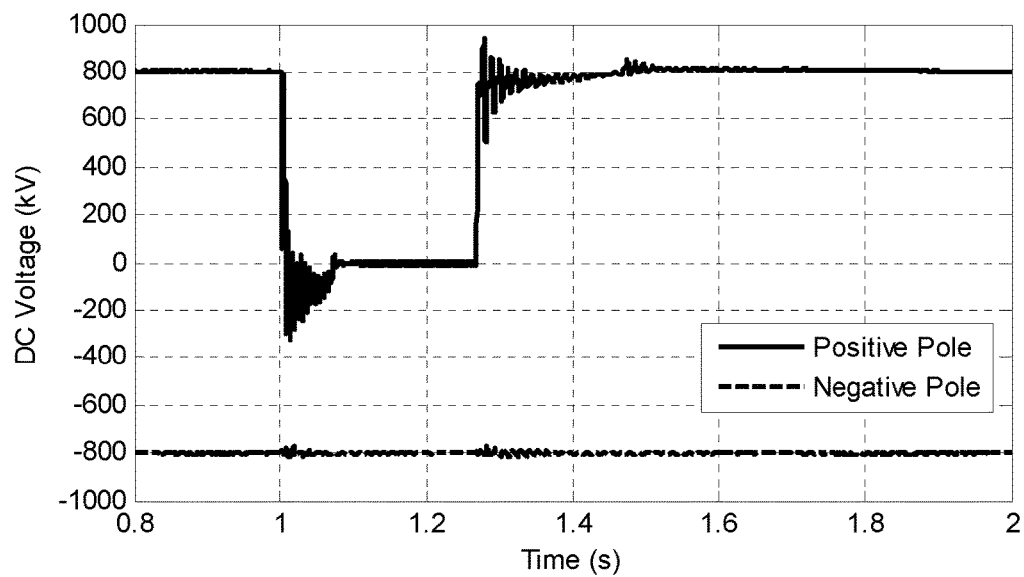
FIG. 7a is a waveform diagram of rectifier DC voltage of the present invention when DC fault of positive pole occurs.
Figure 7B:
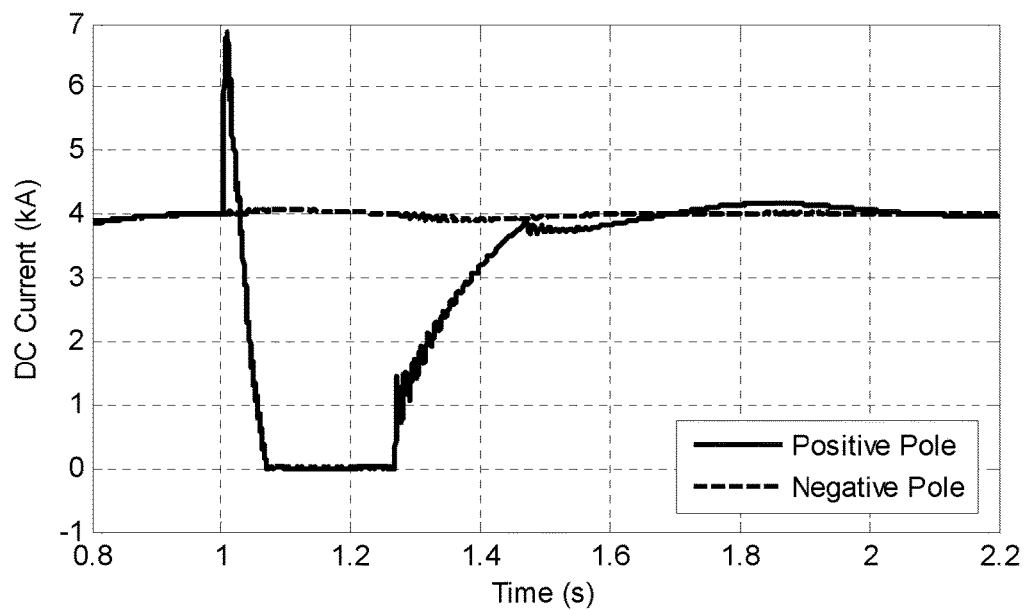
FIG. 7b is a waveform diagram of rectifier DC current of the present invention when DC fault of positive pole occurs.
Figure 7C:
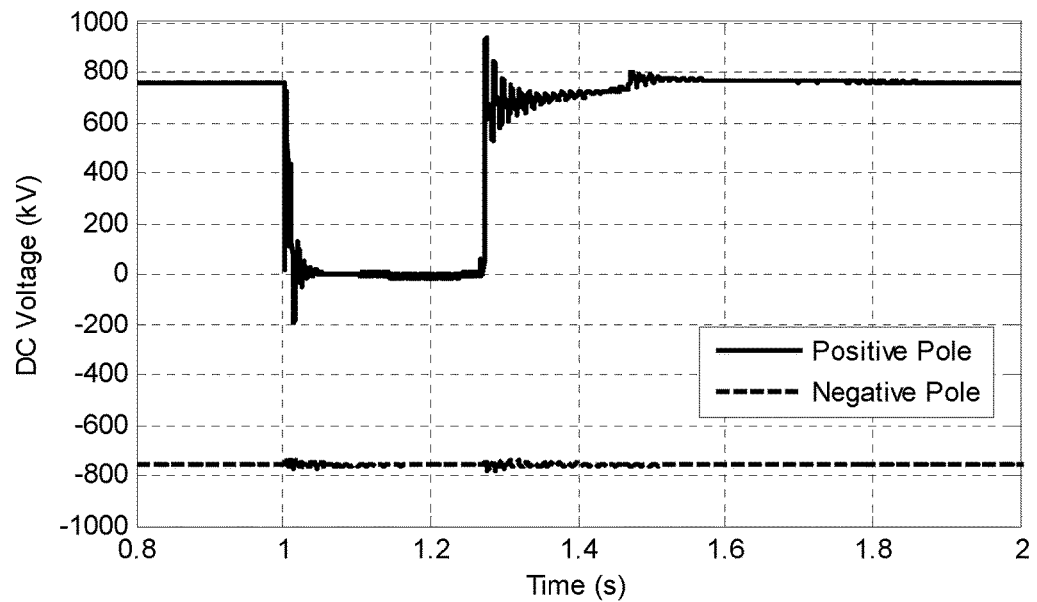
FIG. 7c is a waveform diagram of inverter DC voltage of the present invention when DC fault of positive pole occurs.
Figure 7D:
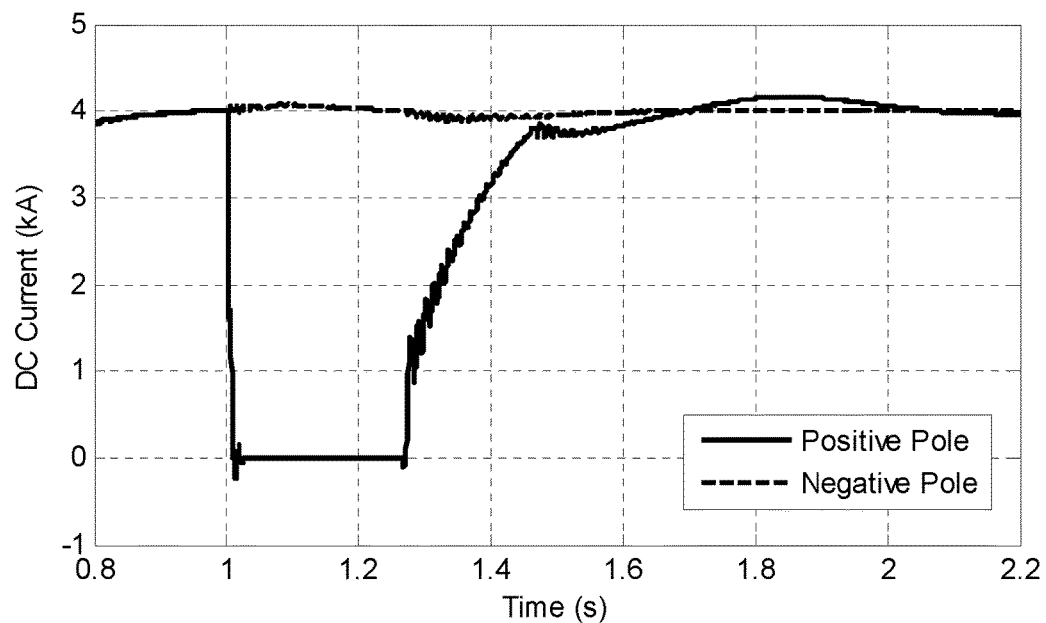
FIG. 7d is a waveform diagram of inverter DC current of the present invention when DC fault of positive pole occurs.

FIGS. 7c and 7d are the waveform of inverter DC voltage and DC current, respectively. The two diagrams show that, after the positive DC fault occurs, the inverter DC current drops to zero due to the unidirectional continuity of LCC; the inverter DC voltage and DC current of negative pole return to normal after slight fluctuation.

After the fault cleared, the system returns to normal smoothly.

The invention claimed is:

1. A series hybrid bipolar DC transmission system having a DC fault ride-through capability, comprising:
a rectifier station fault pole commutation unit and an inverter station fault pole commutation unit, both connected by a DC transmission line;
characterized in that:
the rectifier station fault pole commutation unit is used to transform three-phase AC current from a sending system to DC current and further transmits the DC current to the inverter station fault pole commutation unit by the DC transmission line;
the inverter station fault pole commutation unit is used to transform the DC current to three-phase AC current and further transmits the three-phase AC current to a receiving system, both the rectifier station fault pole commutation unit and the inverter station fault pole commutation unit adopt a bipolar structure, comprising a positive commutation unit and a negative commutation unit connected in series, wherein a connecting point between the positive commutation unit and the negative commutation unit is grounded; the rectifier and inverter commutation units consist of line-commutated converter (LCC) and modular multilevel converter (MMC); wherein, one end of the LCC is connected to the DC transmission line, another end of the LCC is connected to one end of the modular converter; and another end of the modular converter is connected to the ground;
wherein the series hybrid bipolar DC transmission system is able to deal with DC fault by a force retard of a LCC at a rectifier side, a unidirectional continuity of a LCC at an inverter side and a blocking of the MMC at both sides;
wherein a firing angle for the force retard of the LCC at the rectifier side is between 135°~145° while applying a latching control to the modular converter in the rectifier station fault pole commutation unit so that the series hybrid bipolar DC transmission system outputs a negative voltage on the rectifier station fault pole commutation unit to eliminate a fault current provided by the fault pole commutation unit and by the inverter station pole commutation unit due to the unidirectional continuity of a thyristor converter corresponding to the LLC.

2. The series hybrid bipolar DC transmission system according to claim 1, characterized in that: the modular converter adopts one modular multilevel converter (MMC) or several parallel-connected MMCs; if several parallel-connected MMCs are adopted, the modular converter equips current balance control.

3. The series hybrid bipolar DC transmission system according to claim 1, characterized in that: a passive filter is connected to a three-phase AC bus of the sending system and the receiving system.

4. The series hybrid bipolar DC transmission system according to claim 1, characterized in that: positive and negative poles of the rectifier and the inverter connect the DC transmission line through a smoothing reactor.

5. The series hybrid bipolar DC transmission system according to claim 1, characterized in that: the LCC adopts twelve-pulse bridge converter; each bridge arm comprises several series-connected thyristor valves.

6. The series hybrid bipolar DC transmission system according to claim 1, characterized in that: the LCC is connected to the sending system through one three-winding transformer of $Y_o/Y/\Delta$ connection, or two two-winding transformers of $Y_o/\Delta$ and $Y_o/Y$ connection, respectively; the MMC is connected to the receiving system through one two-winding transformer of $\Delta/Y_o$ connection.

7. The series hybrid bipolar DC transmission system according to claim 1, characterized in that:
the MMC adopts a three-phase six-arm structure; an arm consists of several series-connected commutation modules; each of the series-connected commutation modules adopts half-bridge submodule (HBSM); the HBSM consists of two switch tubes (T1 and T2) and one capacitor; wherein, one end of T1 and one end of T2 are connected and form the positive pole of HBSM; another end of T1 connects one end of the capacitor; another end of T2 and another end of the capacitor are connected and form the negative pole of HBSM; both control ends of T1 and T2 receive external switch signals.

8. The series hybrid bipolar DC transmission system according to claim 1, characterized in that:
the series hybrid bipolar DC transmission system has three operation modes, namely bipolar current balance mode, monopolar mode with ground return path and monopolar mode with metallic return path.

9. The series hybrid bipolar DC transmission system according to claim 1, characterized in that:
a rated DC voltage ratio of the LCC to the modular converter is not less than 0.8.

\* \* \* \* \*